United States Patent [19]

Morita et al.

[11] Patent Number: 5,093,424
[45] Date of Patent: Mar. 3, 1992

[54] COATING OF EPOXIDIZED POLYBUTADIENE AND BISPHENOL-CAPPED EPOXY RESIN

[75] Inventors: Kaoru Morita; Atsushi Shioda; Kazumi Fukudome; Naruhito Ueno, all of Hiratsuka, Japan

[73] Assignee: Kansai Paint Co., Ltd., Amagasaki, Japan

[21] Appl. No.: 562,921

[22] Filed: Aug. 6, 1990

[30] Foreign Application Priority Data

Aug. 7, 1989 [JP] Japan ................................ 1-204268

[51] Int. Cl.$^5$ .............................................. C08L 9/00
[52] U.S. Cl. ................................... 525/109; 525/524; 525/930
[58] Field of Search ..................... 525/109, 524, 930

[56] References Cited

U.S. PATENT DOCUMENTS

| | | | |
|---|---|---|---|
| 2,907,726 | 10/1959 | Greenlee | 260/19 |
| 2,907,730 | 10/1959 | Greenlee | 260/19 |
| 2,907,731 | 10/1959 | Greenlee | 260/19 |
| 3,932,144 | 1/1976 | Matsubara et al. | 29/195 |
| 3,985,695 | 10/1976 | Tobias et al. | 260/29.2 |
| 4,018,848 | 4/1977 | Khanna | 260/834 |
| 4,151,305 | 4/1979 | Davis et al. | 426/131 |
| 4,212,781 | 7/1980 | Evans et al. | 525/530 |
| 4,251,414 | 2/1981 | Nakada et al. | 525/109 |
| 4,296,005 | 10/1981 | DiBenedetto | 260/18 |
| 4,302,373 | 11/1981 | Steinmetz | 260/29.3 |
| 4,362,853 | 12/1982 | Demmer | 525/533 |
| 4,367,318 | 1/1983 | Ishimura et al. | 525/481 |
| 4,433,078 | 2/1984 | Kersten et al. | 525/524 |
| 4,467,070 | 8/1984 | Kordomenos et al. | 525/110 |
| 4,477,610 | 10/1984 | Ishimura et al. | 523/414 |
| 4,485,199 | 11/1984 | Kordomenos et al. | 523/400 |
| 4,497,938 | 2/1985 | Kordomenos | 525/514 |
| 4,596,861 | 6/1986 | Sheih et al. | 525/481 |
| 4,722,982 | 2/1988 | Tanaka | 525/481 |
| 4,812,537 | 3/1989 | Maki | 525/488 |
| 4,829,104 | 5/1989 | McIntyre et al. | 525/524 |
| 5,010,149 | 4/1991 | Morita et al. | 525/481 |

FOREIGN PATENT DOCUMENTS

| | | | |
|---|---|---|---|
| 0115432 | 8/1984 | European Pat. Off. | |
| 55-115442 | 9/1980 | Japan | 525/524 |
| 59-36124 | 2/1984 | Japan | 525/109 |
| 61-268768 | 11/1986 | Japan . | |
| 62-275166 | 11/1987 | Japan . | |

*Primary Examiner*—Melvyn I. Marquis
*Assistant Examiner*—Robert E. Sellers II
*Attorney, Agent, or Firm*—Fisher, Christen & Sabol

[57] ABSTRACT

Disclosed is a coating composition for metal coating, said coating composition containing (A) at least one of an epoxidized polybutadiene resin and an epoxy group-containing polyhydric phenol-modified epoxidized polybutadiene resin, and (B) at least one of a capped epoxy resin and a methylol group-containing capped epoxy resin.

10 Claims, No Drawings

COATING OF EPOXIDIZED POLYBUTADIENE AND BISPHENOL-CAPPED EPOXY RESIN

BACKGROUND OF THE INVENTION (1) Field of the Invention

The present invention relates to a coating composition for metal coating, and more particularly to a coating composition for metal coating, which is used in a so-called precoated metal sheet, in which a post processing is applied to a dry film formed by coating, curing and drying.

(2) Description of the Prior Art

The following various resin-based coating compositions are commercially available as the coating composition for metal coating. Examples of the above coating compositions may include lacquer type coating compositions such as vinyl chloride resin based coating composition, cellulose acetate resin based coating composition and the like, and heat curing type coating compositions such as epoxy-amino resin based coating composition, epoxy-phenol resin based coating composition, polyester-amino resin based coating composition, acryl-amino resin based coating composition and the like.

In recent years, needs of short time curing are increasing from the standpoints of economizing resources and energy.

However, the coating composition in the prior art, for example, the lacquer type coating composition is applicable to short time curing, but raises problems in processability and corrosion resistance.

The above heat curing type coating composition, for example, is incapable of obtaining a sufficiently cured film by short time curing, and consequently raises problems in processability, corrosion resistance, etc. Increase in the curing temperature to obtain a sufficiently cured film causes a violent reaction to take place and causes a remarkable foaming to take place in the film without solving the above problems. On the other hand, Japanese Patent Application Laid-Open No. 268768/86, for example, discloses a coating composition having suitability for the short time curing. The use of the above coating composition solves the problem of the foaming developed in the film under the curing conditions of high temperatures and short period of time. However, the above coating composition is not satisfactory in the processability and corrosion resistance under severe conditions because of film brittleness considered to be caused by self-condensation of a resol phenol resin conventionally used as a curing agent.

SUMMARY OF THE INVENTION

It is an object of the present invention to provide a coating composition for metal coating, which is capable of being cured in a short period of time at high temperatures to form such a film that no foaming takes place in the film when being cured even under such severe conditions as of a film thickness of 40 μm or more and that the film shows good processability and high corrosion resistance, too.

The present invention provides a coating composition for metal coating, said coating composition containing (A) at least one of an epoxidized polybutadiene resin and an epoxy group-containing polyhydric phenol-modified epoxidized polybutadiene resin, and (B) at least one of a capped epoxy resin and a methylol group-containing capped epoxy resin.

DETAILED DESCRIPTION OF THE INVENTION

The epoxidized polybutadiene resin used as the component (A) of the present invention may include conventionally known resins obtained by introducing oxirane group through a functional group such as double bond, hydroxyl group, carboxyl group or the like in a liquid polybutadiene resin.

For example, the epoxidized polybutadiene resin may be obtained by introducing oxirane group through double bond in the liquid polybutadiene resin, for example, by modifying the liquid polybutadiene resin with a peracid such as peracetic acid, performic acid or the like. It may also be obtained by reacting the liquid polybutadiene resin with a low-molecular epoxy compound such as epihalohydrin or the like.

Specific examples of the above epoxidized polybutadiene resin may include R-45EPI and R-15EPI (trade name, marketed by Idemitsu Petrochemical Co., Ltd. respectively); E-1000-8, E-1800-6.5, E-1000-3.5 and E-700-6.5 (trade name, marketed by Nippon Petrochemicals Co., Ltd. respectively); BF-1000 (trade name, marketed by Adeka Argus Chemical Co., Ltd.); and the like.

The epoxidized polybutadiene resin obtained by introducing oxirane group through carboxyl group in the liquid polybutadiene resin may include, for example, ones obtained by reacting the liquid polybutadiene resin with a compound or resin, which having two or more oxirane groups in one molecule, for example, diglycidyl ether, glycidylphenylglycidyl ether, 2,6-diglycidyltetraglycidyl ether, epichlorohydrin bisphenol and the like.

Of these, ones containing 20% by weight or more of a butadiene unit comprising 1,2-linkage in the liquid polybutadiene resin are preferably used.

The epoxidized polybutadiene resin contains 3-12% by weight on an average, preferably 3-9% by weight on an average of oxirane oxygen, i.e. oxygen atom in oxirane group, and has a number average molecular weight of 1000-10000, preferably 1000-3500.

The epoxy group-containing polyhydric phenol-modified epoxidized polybutadiene resin obtained by reacting the epoxidized polybutadiene resin with a polyhydric phenol compound and used as the above component (A) may include ones obtained by reacting the above epoxidized polybutadiene resin with a polyhydric compound. The polyhydric phenol compound used may include ones containing 2 or more on an average, preferably 2-3 of phenolic hydroxyl group in one molecule. Specific examples of the polyhydric phenol compound may include monocyclic phenol compounds such as catechol, resorcin, hydroquinone, pyrogallol, hydroxyhydroquinone, phloroglucinol and the like; and polycyclic phenol compounds represented by the following general formula (I):

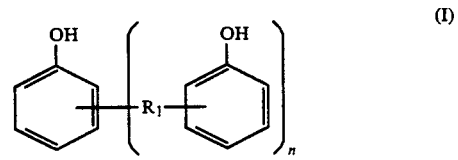

where hydrogen atom on the aromatic ring may be unsubstituted or substituted by halogen atom, hydroxyl group, alkyl group, alkoxy group, nitro group, amino group or cyano group, $R_1$ is alkylene group, —O—, —CH$_2$O—, —CH$_2$OCH$_2$— or —SO$_2$—, and n is an integer of 1–10.

In the above general formula (I), the halogen atom may include fluorine atom, chlorine atom, bromine atom and the like, the alkyl group may include ones of $C_1$-$C_8$, for example, methyl, ethyl, propyl, butyl, pentyl, octyl and the like, the alkoxy group may include ones of $C_1$-$C_8$, for example, methoxy, ethoxy, propoxy, butoxy, pentoxy, octyloxy and the like, and the alkylene group may preferably include ones of $C_1$-$C_5$, for example, —CH$_2$—, —C(CH$_3$)$_2$—, —C(C$_2$H$_5$)(CH$_3$)— and the like.

Specific examples of the polycyclic phenol compounds represented by the general formula (I) may include
2,2-bis(4-hydroxyphenyl)propane, i.e. bisphenol A,
2,2-bis(4-hydroxyphenyl)butane, i.e. bisphenol B,
1,1-bis(4-hydroxyphenyl)ethane,
bis(4-hydroxyphenyl)methane, i.e. bisphenol F,
4-hydroxyphenyl ether,
p-(4-hydroxy)phenol,

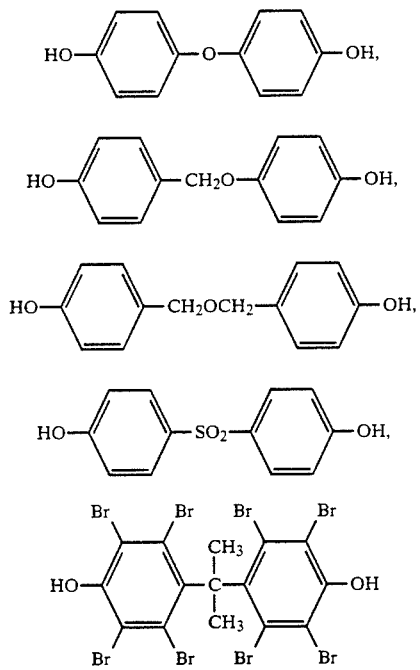

and the like.

The reaction of the epoxidized polybutadiene resin with the polyhydric phenol compound is normally carried out by heating a mixture of the epoxidized polybutadiene resin and the polyhydric phenol compound at about 100°–200° C., preferably about 140°–160° C. in the presence of a catalyst.

The above catalyst may include conventionally known ring opening catalysts for oxirane group, for example, ammonia and amine compounds such as ammonia, dimethyl amine, diethanol amine and the like; and quaternary ammonium salts such as triethyl ammonium bromide, trimethyl ammonium chloride and the like.

A ratio of the epoxidized polybutadiene resin to the polyhydric phenol compound to be reacted is such that a dihydric phenol compound, for example, may be used in an amount of 0.45 mole or less, and a trihydric phenol compound may be used in an amount of 0.3 mole or less per one oxirane group in the epoxidized polybutadiene resin respectively.

When the amount of the polyhydric phenol compound is more than the above range, a content of oxirane oxygen in the resin is undesirably reduced, resulting in forming a film having poor curing properties.

The so-called capped epoxy resin used as the component (B) in the present invention, i.e. a modified bisphenol based epoxy resin, may be prepared as follows.

A bisphenol based epoxy resin having an epoxy equivalent of 180–7000 and a number average molecular weight of 350–10000 is directly reacted with bisphenol. The above reaction may easily be carried out normally at 130°–200° C. Since it is necessary that bisphenol residual group remains at the molecular terminal of the reaction product, it is necessary for the latter phenolic hydroxyl group to be in the range of 1–2 moles, preferably 1.4–2.0 moles per one mole of epoxy group.

Examples of commercially available ones as the above bisphenol based epoxy resin may include Epikote 828 (trade name) having an epoxy equivalent of about 180 and a number average molecular weight of about 360, and Epikote 1007 (trade name) having an epoxy equivalent of 1700 and a number average molecular weight of about 2900 marketed by Shell Chemical Co., Ltd. respectively; Epiclon 7055 (trade name) having an epoxy equivalent of about 1800 and a number average molecular weight of about 2900 marketed by Dainippon Ink and Chemicals Incorporated; XPY306 (trade name) having an epoxy equivalent of about 310 and a number average molecular weight of about 320, and XB-4122 (trade name) having an epoxy equivalent of about 310 and a number average molecular weight of about 620 marketed by Ciba-Geigy Ltd.

The above bisphenol may include ones represented by the general formula (II):

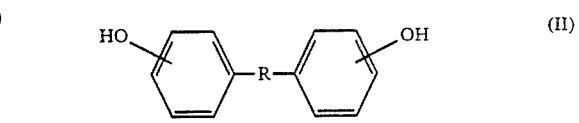

where R is a bivalent aliphatic hydrocarbon group having 1–4 carbon atoms. The specific examples of the bisphenol may include bis(4-hydroxyphenyl)-2,2-propane, i.e. bisphenol A, bis(4-hydroxyphenyl)methane, i.e. bisphenol F, bis(4-hydroxyphenyl)-1,1-ethane, bis(4-hydroxyphenyl)-1,1-isobutane, and the like, bisphenol A and bisphenol F being preferred.

On the other hand, the methylol group-containing capped epoxy resin, which is prepared by a resol-forming reaction, i.e. a resolification reaction of the modified bisphenol based epoxy resin with formaldehydes, may also be used as the component (B) of the present invention.

The methylol group-containing capped epoxy resin is explained below.

The modified bisphenol based epoxy resin used in the resolification reaction, i.e. the so-called capped epoxy resin may advantageously include such ones that the bisphenol based epoxy resin constituting the modified bisphenol based epoxy resin has a number average molecular weight of 350 to 6,000, preferably 350 to 1,000 and an epoxy equivalent of 150 to 4,000, preferably 150 to 700.

The above bisphenol based epoxy resin is reacted with bisphenols to obtain the modified bisphenol based epoxy resin which has an epoxy equivalent of 500 or more, preferably 10,000 or more, or substantially in which bisphenols have reacted on one terminal or both terminals of the epoxy resin molecule to be used. The resolification reaction by use of the modified bisphenol based epoxy resin is carried out by dissolving the modified resin in an organic solvent, followed by adding formaldehydes to be reacted in the presence of a basic catalyst. The organic solvent used in the above reaction may include ones to dissolve the modified bisphenol based epoxy resin, for example, alcohols such as n-butyl alcohol, cellosolves such as butylcellosolve, and the like.

The basic catalyst used may include well known ones as the resolification catalyst, for example, metal alkalis such as sodium hydroxide, calcium hydroxide and the like, basic salts such as tribasic sodium phosphate, amines such as triethylamine, and the like. The above basic catalyst is used in an amount of 0.005 to 0.2 mole per one mole of the modified bisphenol based epoxy resin. When the above amount is less than 0.005 mole, the rate of the resolification reaction is very low, and when it is more than 0.2 mole, the catalyst residue in the produced resin, causes troubles. Formaldehydes used in the resolification reaction include an aqueous formalin, formaldehyde, which is dissolved in an organic solvent, and paraformaldehyde. The formaldehydes are used in an amount of 1 to 6 moles, preferably 2 to 4 moles per one mole of the terminal bisphenol of the modified bisphenol based epoxy resin.

The methylol group-containing capped epoxy resin synthesized according to the above process has such characteristics that it contains appreciably less amounts of low molecular weight ingredient compared with the conventional resol phenol resin synthesized from phenols, resulting in that its self-condensation is controlled and that it provides a film having excellent properties in processability, etc.

The mixing ratio of the above component (A) to the component (B) is generally in the range of 40 to 95 parts by weight, preferably 50 to 80 parts by weight of the former to 60 to 5 parts by weight, preferably 50 to 20 parts by weight of the latter. When the above ratio is outside the above range, applicability to the above short time curing process is so greatly inhibited that the intended object may not be achieved.

The coating composition for metal coating of the present invention contains the above components (A) and (B) as the essential components, and may include as optional additives, for example, curing promotors i.e. acid catalysts such as phosphoric acid and p-toluenesulfonic acid, dryers such as manganese naphthenate and cobalt naphthenate, amines such as trimethylamine and triethylamine, organic peroxides such as benzoyl peroxide, and the like; organic solvents such as aromatic solvent, aliphatic solvent, ketone solvent, ester solvent, glycol solvent and the like, plasticizers, pigments, surfactants, lubricants, amino resin, vinyl acetate resin, vinyl chloride-vinyl acetate copolymer resin, polyester resin, polyvinyl chloride resin, polyolefin resin, polyamide resin, and the like.

According to the present invention, the use of the component (B) as a curing resin minimizes the self-condensation, dehydration-condensation reaction, etc. of the component (A) as a basic resin, and makes possible high molecular weight the basic resin in a very short period of time, resulting in providing a coating composition for metal coating, which is capable of being cured in a short period of time at high temperatures to form such a film that no foaming takes place in the film when being cured even under such severe conditions as of a film thickness of 40 μm or more and that the film shows good processability and high corrosion resistance, too.

The present invention is explained more in detail by the following Examples and Comparative Examples, in which "part" and "%" are all by weight.

Examples of epoxidized polybutadiene resins used as the component (A)

(a) BF-1000 (trade name) marketed by Adeka Argus Chemical Co., Ltd., having a butadiene unit comprising 1,2-linkage of 100%, an oxirane oxygen of 7.5% and a molecular weight of 1000.

(b) E-1800-6.5 (trade name) marketed by Nippon Petrochemicals Co., Ltd., having a butadiene unit comprising 1,4-linkage of 40%, a butadiene unit comprising 1,2-linkage of 60%, an oxirane oxygen of 6.5% and a molecular weight of 1800.

(c) R-45EPI (trade name) marketed by Idemitsu Petrochemical Co., Ltd., having a butadiene unit comprising 1,4-linkage of 80%, a butadiene unit comprising 1,2-linkage of 20%, an oxirane oxygen of 7.7% and a molecular weight of 3000.

Preparation Examples of bisphenol-modified epoxidized polybutadiene resins used as the component (A)

(d) A mixture of 100 parts of (a) epoxidized polybutadiene resin, 122 parts of bisphenol F, 800 ppm of tetraethylammonium bromide and 100 parts of SWASOL-1000 were dissolved. The resulting solution was reacted at 140° C. for 5 hours to obtain a bisphenol-modified epoxidized polybutadiene resin having a Gardner Holdt viscosity of 0 and a Hellige color number of 8, and containing 0.09 mole of addition bisphenol F.

(e) A mixture of 100 parts of epoxidized polybutadiene resin (c), 15 parts of bisphenol A, 800 ppm of tetraethylammonium bromide and 100 parts of butyl cellosolve was dissolved. The resulting solution was reacted at 140° C. for 5 hours to obtain a bisphenol-modified epoxidized polybutadiene resin having a Gardner Holdt viscosity of U and a Hellige color number of 7, and containing 0.03 mole of addition bisphenol A.

Preparation Examples of capped epoxy resin and methylol group-containing capped epoxy resin as the component (B)

(f) A flask equipped with a stirring device, thermometer and condenser was charged with 587 parts of Epikote 1009 (trade name of epoxy resin, marketed by Shell Chemical Co., Ltd., having an epoxy equivalent of 2,790), 26 parts of bisphenol A and 513 parts of 3-methoxybutyl acetate to be kept at 130° C. with agitation.

About 12 hours after, the epoxy value became 0.004. Thereafter, 377 parts of methyl isobutyl ketone was added to obtain a modified epoxy resin having a concentration of 40%.

(g) A flask was charged with 389 parts of Epikote 828 (trade name of epoxy resin, marketed by Shell Chemical Co., Ltd., having an epoxy equivalent of 188) as the epoxy resin, 201 parts of bisphenol A and 163 parts of 3-methoxybutyl acetate to be kept at 130° C. About 8 hours after, the epoxy value became 0.038. Thereafter, 422 parts of 3-methoxybutyl acetate and 390 parts of methyl isobutyl ketone were added to obtain a modified epoxy resin having a concentration of 40%.

(h) A reactor equipped with a stirrer and a reflux condenser was charged with 228 parts of bisphenol A, 188 parts of Epikote 828 and 0.1% of tri-n-butylamine, followed by heating at 160° C. and reacting for 4 hours to obtain a bisphenol A-terminated modified epoxy resin having an epoxy equivalent of 10500, by cooling, adding 229 parts of n-butanol, dissolving the above modified epoxy resin, adding 22 parts of 1 N-NaOH and 162 parts of 37% aqueous formalin, heating up to 80° C., carrying out resolification reaction for 4 hours, washing with water, discharging the separating solvent and water, heating under a reduced pressure of 650 mmHg, dehydrating, removing solvent and free formalin and diluting with n-butanol to obtain a specialty resol resin having a weight average molecular weight of 3200.

(i) A reactor was charged with 163 parts of bisphenol A, 188 parts of Epikote 828, 0.1% of tri-n-butylamine and 38 parts of butyl cellosolve to be reacted for 4 hours at 160° C. for obtaining a bisphenol A-terminated modified epoxy resin having an epoxy equivalent of 14000. The modified epoxy resin was dissolved in 160 parts of n-butanol, followed by adding 46 parts of 1 N-NaOH and 145 parts of 37% aqueous formalin, reacting for 6 hours at 90° C., removing solvent, and diluting with n-butanol to a concentration of 40%. As the result, a specialty resol resin having a weight average molecular weight of 4500 was obtained.

EXAMPLES 1-7

The above epoxidized polybutadiene resins (a)-(c), bisphenol-modified epoxidized polybutadiene resins (d) and (e), and the above capped epoxy resins (f)-(i) were mixed according to the formulations (as solids) as shown in Table-1, followed by diluting with butyl cellosolve so that the resulting total solids content may be 40% to obtain coating compositions of Examples 1-7 respectively.

COMPARATIVE EXAMPLE 1

The above epoxidized polybutadiene resin (a) and Hitanol 4020 (trade name of resol phenol resin marketed by Hitachi Chemical Co., Ltd.) were mixed at a mixing ratio of 75 parts to 25 parts as solids, followed by diluting with butyl cellosolve so that the resulting total solids content may be 40% to obtain a coating composition of Comparative Example 1.

COMPARATIVE EXAMPLE 2

The above resin (e) and the above Hitanol 4020 were mixed at a mixing ratio of 70 parts to 30 parts as solids, followed by diluting with butyl cellosolve so that the resulting total solids content may be 40% to obtain a coating composition of Comparative Example 2.

COMPARATIVE EXAMPLE 3

Epikote 1009 (trade name of epoxy resin having a number average molecular weight of 3800, marketed by Shell Chemical Co., Ltd.) was dissolved in a 1:1 mixed solution of xylene and butyl cellosolve to obtain a 40% Epikote 1009 solution. The Epikote solution and the above resin (h) were mixed at a mixing ratio of 60 parts to 40 parts as solids, followed by diluting with butyl cellosolve so that the resulting total solids content may be 30% to obtain a coating composition of Comparative Example 3.

COMPARATIVE EXAMPLE 4

Epikote 1004 (trade name of epoxy resin having a number average molecular weight of 1600, marketed by Shell Chemical Co., Ltd.) was dissolved in a 1:1 mixed solution of xylene and butyl cellosolve to prepare a 50% Epikote 1004 solution. The Epikote 1004 solution and the above resin (g) were mixed at a mixing ratio of 50 parts to 50 parts as the solids, followed by diluting with butyl cellosolve so that the resulting total solids content may be 40% to obtain a coating composition of Comparative Example 4.

COMPARATIVE EXAMPLE 5

Acrydic A-606-50S (trade name of acrylic resin marketed by Dainippon Ink and Chemicals Incorporated), Super Beckamine J-820-60 (trade name of butylated melamine resin marketed by Dainippon Ink and Chemicals Incorporated) and Cymel 370 (trade name of methylated melamine resin marketed by Mitsui Cyanamide Co., Ltd.) were mixed at a mixing ratio of 85 parts:15 parts:5 parts as solids, followed by diluting with butyl cellosolve so that the resulting total solids content may be 40% to obtain an acrylic-amino resin based coating composition of Comparative Example 5.

COMPARATIVE EXAMPLE 6

Vylon 200 (trade name of polyester resin marketed by Toyobo Co., Ltd.) was dissolved in a 1:1 mixed solution of Solvesso #100 (trade name of aromatic petroleum derivatives) and cyclohexanone to obtain a 30% Vylon 200 solution. The Vylon 200 solution and Cymel 303 (trade name of methylated melamine resin marketed by Mitsui Cyanamide Co., Ltd.) were mixed at a mixing ratio of 85 parts:15 parts as solids, followed by adding 0.5 part as solids of NACURE 5225 (trade name of dodecylbenzene sulfonic acid marketed by KING INDUSTRIES) per 100 parts of a total solids of the above Vylon 200 solution and Cymel 303, diluting with butyl cellosolve so that the resulting total solids content may be 30% to obtain a polyester-amino resin based coating composition of Comparative Example 6.

COMPARATIVE EXAMPLE 7

Epikote 1007 (trade name of epoxy resin having a number average molecular weight of 2900, marketed by Shell Chemical Co., Ltd.) was dissolved in a 1:1 xylene and butyl cellosolve mixed solution to obtain a 40% Epikote 1007 solution. The Epikote 1007 solution and Beckamine P-106-M (trade name of butylated urea resin marketed by Dainippon Ink and Chemicals Incorporated) were mixed at a mixing ratio of 80 parts to 20 parts as solids, followed by diluting with butyl cellosolve so that the resulting total solids content may be 30% to obtain an epoxy-amino resin based coating composition of Comparative Example 7.

Preparation of test pieces

The coating compositions obtained in Examples and Comparative Examples were coated onto a galvanized sheet (subjected to bonderizing #37 treatment to a thickness of 0.3 mm) by use of an applicator to a dry film thickness of 35-40 μm, followed by curing in a tunnel gas oven under such conditions that the temperature of the galvanized sheet reaches 260° C. in 20 seconds.

Of the test pieces cured under the above conditions, ones showing remarkable foaming (some of Comparative Examples) were preliminarily dried at 100° C. for 5 minutes, followed by carrying out the above curing to prepare test pieces so as to be used in other tests than the foaming test.

Test Items and Test Methods (1) Foaming conditions of coated film

The foaming conditions of a coated film were evaluated by the naked eye according to the following standards.

| | |
|---|---|
| No foaming is observed all over the coated film: | ○ |
| Small foams are observed all over the coated film in a small amount: | △ |
| Small foams are observed all over the coated film in an appreciable amount: | △ |
| Large foams are observed all over the coated film in an appreciable amount: | x |

(2) Gel Fraction

A vessel equipped with a reflux condenser is charged with a test piece and methyl ethyl ketone so that the coating area to the amount of methyl ethyl ketone may be 1 cm$^2$ to 1 ml, followed by heating for reflux. The gel fraction is represented by percentage of an amount of residue after one hour's reflux.

(3) Du Pont Impact Processability

A test piece was placed at the bottom of Du Pont impact tester so that the coated film surface may be inside, an impact rod having a semispherical tip radius of ⅜ inch was set on the above test piece, and a 500 g weight was allowed to fall down from a height of 50 cm. The processed area according to the impact test was dipped into an aqueous copper sulfate solution, and the degree of deposition of copper was graded by the naked eye according to following standards for evaluating impact processability.

| | |
|---|---|
| No deposition of copper was observed: | ○ |
| Deposition of copper was observed in a small amount: | △ |
| Deposition of copper was observed in an appreciable amount: | △ |
| Deposition of copper was observed all over the processed area: | x |

(4) Fold Processability

Test pieces doubly folded so that the coated film may be outside were placed at the bottom of a specially folding impact tester, and a 3 kg iron weight having a smooth contacting surface was allowed to fall down from a height of 50 cm, followed by dipping the folded and processed area into an aqueous copper sulfate solution, and grading the degree of deposition of copper by the naked eye according to the following standards for evaluating fold processability.

| | |
|---|---|
| No deposition of copper was observed: | ○ |
| Deposition of copper was observed in a small amount: | △ |
| Deposition of copper was observed in an appreciable amount: | △ |
| Continuous deposition of copper was observed over the processed area: | x |

(5) Chipping-Salt Spray Test

Test pieces were vertically set at a distance of 30 cm from a gravel injection outlet of a gravelometer, and 250 gr of granite gravels was sprayed onto the test pieces by use of a pressurized air feeding device operating under an injecting air pressure of 4 kg/cm$^2$ and at an air flow rate of 40 l/sec, followed by removing the test pieces, shaking down the gravels and film pieces attached onto the coated film, placing the resulting test pieces in a salt spray test apparatus according to JIS Z 2371-76, 120 hours after removing the test pieces, washing with water, and grading development of corrosion from the chipping scratches by the naked eye according to the following standards for evaluation.

| | |
|---|---|
| 0-1 mm: | ○ |
| 1-5 mm: | △ |
| 5-10 mm: | △ |
| 10 mm or larger: | x |

The results of the above tests (1)-(5) are shown in Table-1.

TABLE 1

| | | Ex. & Comp. Ex. | | | | | | | | | | | | |
|---|---|---|---|---|---|---|---|---|---|---|---|---|---|---|
| | | Examples | | | | | | | Comparative Examples | | | | | |
| | | 1 | 2 | 3 | 4 | 5 | 6 | 7 | 1 | 2 | 3 | 4 | 5 | 6 | 7 |
| Formulations (by solids) | Kinds of resins (A) and Epikote | (a) | (b) | (c) | (d) | (e) | (a) | (c) | (a) | (e) | Epikote 1009 | Epikote 1004 | Acrylic-amino resin based coating composition | Polyester-amino resin based coating composition | Epoxy-amino resin based coating composition |
| | Amounts (parts) of resins (A) and Epikote | 75 | 60 | 60 | 50 | 70 | 80 | 50 | 75 | 70 | 60 | 50 | | | |
| | Kinds of resins (B) and Hitanol | (f) | (g) | (h) | (f) | (h) | (i) | (g) | Hitanol 4020 | Hitanol 4020 | (h) | (g) | | | |
| | Amounts (parts) of resins (B) and Hitanol | 25 | 40 | 40 | 50 | 30 | 20 | 50 | 25 | 30 | 40 | 50 | | | |
| Test results | Foaming in coated film | ○ | ○ | ○ | ○ | ○ | ○ | ○ | ○ | ○ | x | △ | △ | x | x |
| | Gel fraction (%) | 89 | 90 | 94 | 91 | 94 | 85 | 95 | 62 | 92 | 88 | 58 | 62 | 71 | 78 |
| | Du Pont impact processability | ○ | ○ | ○ | ○ | ○ | ○ | ○ | ○ | ○ | ○ | x | △ | ○ | △ |
| | Fold processability | ○ | ○ | ○ | △ | ○ | ○ | | △ | △ | △ | x | x | △ | x |
| | Chipping-Salt Spray Test | △ | △ | ○ | △ | ○ | △ | ○ | x | △ | ○ | x | △ | △ | △ |

What is claimed is:

1. A coating composition for metal coating, said coating composition containing (A) at least one of an epoxidized polybutadiene resin and an epoxy group-containing polyhydric phenol-modified epoxidized polybutadiene resin, and (B) at least one of a bisphenol-modified, bisphenol based epoxy resin and a methylol group-containing capped epoxy resin.

2. A coating composition as claimed in claim 1, wherein the epoxidized polybutadiene resin contains 3-12% by weight on an average of oxirane oxygen and has a number average molecular weight of 1000 to 10000.

3. A coating composition as claimed in claim 1, wherein the epoxidized polybutadiene resin contains 3-9% by weight on an average of oxirane oxygen and has a number average molecular weight of 1000 to 3500.

4. A coating composition as claimed in claim 1, wherein the epoxy group-containing polyhydric phenol-modified epoxidized polybutadiene resin is obtained by reacting the epoxidized polybutadiene resin with a polyhydric phenol compound, a ratio of the epoxidized polybutadiene resin to the polyhydric phenol compound to be reacted being such that a dihydric phenol compound is used in an amount of 0.45 mole or less and a trihydric phenol compound is used in an amount of 0.3 mole or less per one oxirane group in the epoxidized polybutadiene resin respectively.

5. A coating composition as claimed in claim 1, wherein the bisphenol-modified, bisphenol based epoxy resin is obtained by reacting a bisphenol based epoxy resin directly with bisphenol under such conditions that the phenolic hydroxyl group is in the range of 1-2 moles per one mole of epoxy group.

6. A coating composition as claimed in claim 1, wherein the bisphenol-modified, bisphenol based epoxy resin is obtained by reacting a bisphenol based epoxy resin directly with bisphenol under such conditions that the phenolic hydroxyl group is in the range of 1.4-2.0 moles per one mole of epoxy group.

7. A coating composition as claimed in claim 1, wherein the methylol group-containing capped epoxy resin is prepared by a resolification reaction of the modified bisphenol based epoxy resin with formaldehydes, a bisphenol based epoxy resin constituting the modified bisphenol based epoxy resin having a number average molecular weight of 350 to 6,000 and an epoxy equivalent of 150 to 4,000, the modified bisphenol based epoxy resin having an epoxy equivalent of 500 or more, the resolification reaction being carried out by dissolving the modified resin in an organic solvent, followed by adding formaldehydes to be reacted in the presence of a basic catalyst in an amount of 0.005 to 0.2 mole per one mole of the modified bisphenol based epoxy resin, the formaldehydes being used in an amount of 1-6 moles per one mole of the terminal bisphenol of the modified bisphenol based epoxy resin.

8. A coating composition as claimed in claim 1, wherein a mixing ratio of the above component (A) to the component (B) is in the range of 40 to 95 parts by weight of the former to 60 to 5 parts by weight of the latter.

9. A coating composition as claimed in claim 1, wherein a mixing ratio of the above component (A) to the component (B) is in the range of 50 to 80 parts by weight of the former to 50 to 20 parts by weight of the latter.

10. A coating composition as claimed in claim 1, said coating composition is used in a precoated metal sheet.

* * * * *